(12) United States Patent
Finestone et al.

(10) Patent No.: US 6,348,246 B1
(45) Date of Patent: Feb. 19, 2002

(54) LAMINATE SHEETING FOR POUCHES

(76) Inventors: Arnold B. Finestone, 2400 Presidential Way, West Palm Beach, FL (US) 33401; Gilbert Bloch, 3349 S. Malo Ct., Palm Beach Gardens, FL (US) 33410

(*) Notice: Subject to any disclaimer, the term of this patent is extended or adjusted under 35 U.S.C. 154(b) by 0 days.

(21) Appl. No.: 08/327,601

(22) Filed: Oct. 24, 1994

Related U.S. Application Data

(60) Continuation-in-part of application No. 08/149,620, filed on Nov. 9, 1993, now Pat. No. 5,518,799, which is a continuation-in-part of application No. 08/057,963, filed on May 4, 1993, now abandoned, which is a division of application No. 07/818,544, filed on Jan. 9, 1992, now Pat. No. 5,244,702.

(51) Int. Cl.$^7$ .................................................. B32B 1/08
(52) U.S. Cl. .................. 428/34.3; 206/524.2; 220/453; 428/35.2; 428/35.3; 428/35.7; 428/35.9
(58) Field of Search ................ 428/34.3, 35.2, 428/35.3, 35.7, 35.9, 458, 461, 463, 483, 516, 520, 910; 206/484.2, 524.2; 220/450, 453

(56) References Cited

U.S. PATENT DOCUMENTS

| | | | | |
|---|---|---|---|---|
| 3,366,229 A | * | 1/1968 | Sanni | 206/484 |
| 3,404,988 A | * | 10/1968 | Rausing | 426/115 |
| 3,986,640 A | * | 10/1976 | Redmond | 222/92 |
| 4,309,466 A | * | 1/1982 | Stillman | 428/35.3 |
| 4,363,841 A | * | 12/1982 | Snow | 428/35.3 X |
| RE31,137 E | * | 2/1983 | Ossian et al. | 428/35.3 X |
| 4,724,982 A | * | 2/1988 | Redmond | 222/94 |
| 4,777,085 A | * | 10/1988 | Murray, Jr. et al. | 428/35.2 X |
| 4,790,429 A | * | 12/1988 | Fukushima | 206/219 |
| 4,806,398 A | * | 2/1989 | Martin, Jr. | 428/34.2 |

* cited by examiner

*Primary Examiner*—Blaine Copenheaver
(74) *Attorney, Agent, or Firm*—Winston & Strawn

(57) ABSTRACT

A pouch or other container for forming an envelope protectively packaging a product such as a flowable or solid food substance. The pouch is fabricated from a laminate sheeting whose plies have different properties that depend on package requirements, at least one ply in the laminate being an oriented, synthetic plastic film of high tensile strength. The plies are adhesively interlaminated at ambient temperature with a water-based adhesive whereby the orientation of the film is unaffected by the laminating process, in the course of which no environmentally objectionable fumes are discharged into the atmosphere.

9 Claims, 2 Drawing Sheets

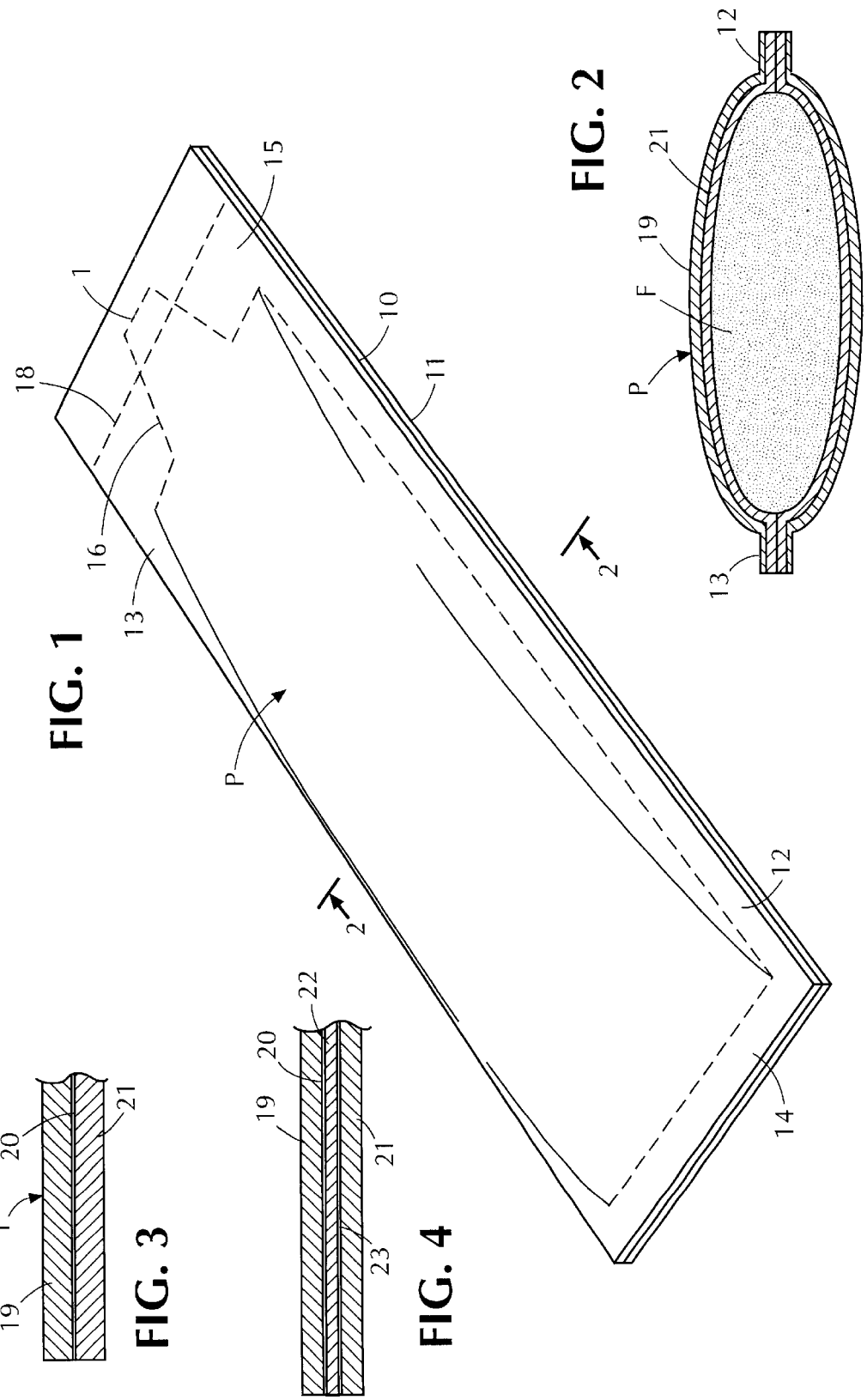

LAMINATE SHEETING FOR POUCHES

RELATED APPLICATIONS

This application is a continuation-in-part of our application Ser. No. 08/149,620, filed Nov. 9, 1993, now U.S. Pat. No. 5,518,799 entitled "Foraminated Paper-Plastic Laminate Sheeting," which in turn is a continuation-in-part of application Ser. No. 08/057,963, filed May 4, 1993 now abandoned entitled "Paper-Plastic Laminate Sheeting," this being a division of application Ser. No. 07/818,544 filed Jan. 9, 1992, entitled "Paper-Plastic Laminate Sheeting" (now U.S. Pat. No. 5,244,702). The entire disclosures of these related applications are incorporated herein by reference.

BACKGROUND OF INVENTION

1. Field of Invention

This invention relates generally to pouches or containers forming an envelope for protectively packaging food substances and other products, and more particularly to a pouch fabricated of laminate sheeting, at least one ply of which is an oriented synthetic plastic film which imparts high strength and tear resistance to the pouch.

2. Status of Prior Art

Pouches or containers for storing and dispensing flowable or solid food substances and other more or less perishable products are usually fabricated of a multi-ply laminate sheeting forming an envelope to protect the contents of the package and prolong its shelf life. The shelf life of a packaged product depends on the degree to which is isolated from the atmosphere in which the package is placed.

One well-known form of pouch serves to package a hot dog relish which is dispensed by tearing an opening in the pouch and then squeezing the pouch to extrude the relish therefrom. This pouch is formed of a laminate sheeting whose outer ply is a clear polyester film, the inner face of which is printed to identify the contents. The outer film ply is adhesively laminated to an intermediate ply of metal foil which in turn is adhesively laminated to an inner ply formed of polyethylene film.

The three plies which together create this laminate sheeting have distinctly different properties. The outer polyester film ply imparts strength and tear resistance to the pouch, the intermediate metal face ply acts as a moisture barrier, while the inner polyethylene ply facilitates sealing of the pouch.

The reason metal foil or a metallized plastic film is often included in laminate sheeting from which a pouch is fabricated to package food, is that plastic films, even those of exceptional tensile strength, have some degree of porosity. As a consequence, a pouch formed entirely of plastic film material will exhibit a moisture vapor transmission rate (MVTR) that is unsuitable in a food container. The transfer of moisture through the envelope of a food pouch reduces its shelf life, and a moisture barrier is therefore desireable.

A serious drawback of multi-ply laminate sheeting of the type heretofore used for fabricating pouches and other packaging material, does not entirely reside in the structure of the sheeting, but rather in the environmental conditions which prevail in the course of producing the sheeting.

Most industrial adhesives used to interlaminate the several plies of the laminate sheeting, include volatile chemical solvents which in the course of curing the adhesive are volatilized. The resultant noxious fumes which are driven off into the atmosphere are environmentally objectionable. It becomes necessary, therefore, in the plant in which the pouch laminate sheeting is produced, to provide filtration and other equipment to capture and treat the noxious fumes. This requirement adds substantially to the cost of production.

In those instances where hot melt adhesives are used to interlaminate the plies of the laminate sheeting, not only do some of these adhesives give off objectionable fumes, but the heat involved may have adverse effect on the plies to which the hot melt adhesive is applied. Thus if one of the plies is a synthetic plastic film that has been uni-axially or bi-axially oriented to enhance its tensile strength, this orientation will be impaired by heat, for heat acts to relax the film and in doing so, to destroy its orientation.

Of prior art background interest are the Fukushima U.S. Pat. No. 4,790,429, as well as the Redmond U.S. Pat. No. 3,986,640 and U.S. Pat. No. 4,724,982 which disclose various forms of pouches and containers for food products formed of plastic film material. The food pouch disclosed in the Sanni U.S. Pat. No. 3,366,229 uses a laminated sheeting of thermoplastic film and paper so that seal lines can be produced by thermal welding. The Martin U.S. Pat. No. 4,806,398 shows a carton for liquid formed by a paper substrate having bonded to one side a polyethylene film and to the other side a polyolefin film to provide a liquid-impermeable laminate that lends itself to thermal bonding. A similar container is shown in the Rawing U.S. Pat. No. 3,404,988.

SUMMARY OF INVENTION

In view of the foregoing, the main object of this invention is to provide a pouch or container forming an envelope for protectively packaging a food substance or other product, the pouch being fabricated of a laminate sheeting of exceptional strength.

A significant advantage of a laminate sheeting in accordance with the invention is that in the course of its production during which the plies of the sheeting are adhesively interlaminated no environmentally objectionable fumes are then emitted. It is therefore not necessary in a production plant to take measures to clean up the atmosphere.

More particularly, an object of this invention is to provide a laminate sheeting for fabricating pouches to package food substances or other products in which at least one ply of the sheeting is formed by an oriented synthetic plastic film of high strength whose orientation is unimpaired in the course of interlamination of the plies.

Briefly stated, these objects are attained by a pouch or other container forming an envelope for protectively packaging a product such as a flowable or solid food substance. The pouch is fabricated from a laminate sheeting whose plies have different properties that depend on package requirements, at least one ply in the laminate being an oriented, synthetic plastic film of high tensile strength. The plies are adhesively interlaminated at ambient temperature with a water-based adhesive whereby the orientation of the film is unaffected by the laminating process, in the course of which no environmentally objectionable fumes are discharged into the atmosphere.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a preferred embodiment of a pouch in accordance with the invention;

FIG. 2 is a transverse section taken through the pouch in the plane indicated by line 2—2 in FIG. 1;

FIG. 3 is a section taken through the laminate sheeting from which the pouch is fabricated;

FIG. 4 is a section taken through a modified form of laminate sheeting; and

DESCRIPTION OF INVENTION

Figure 5:
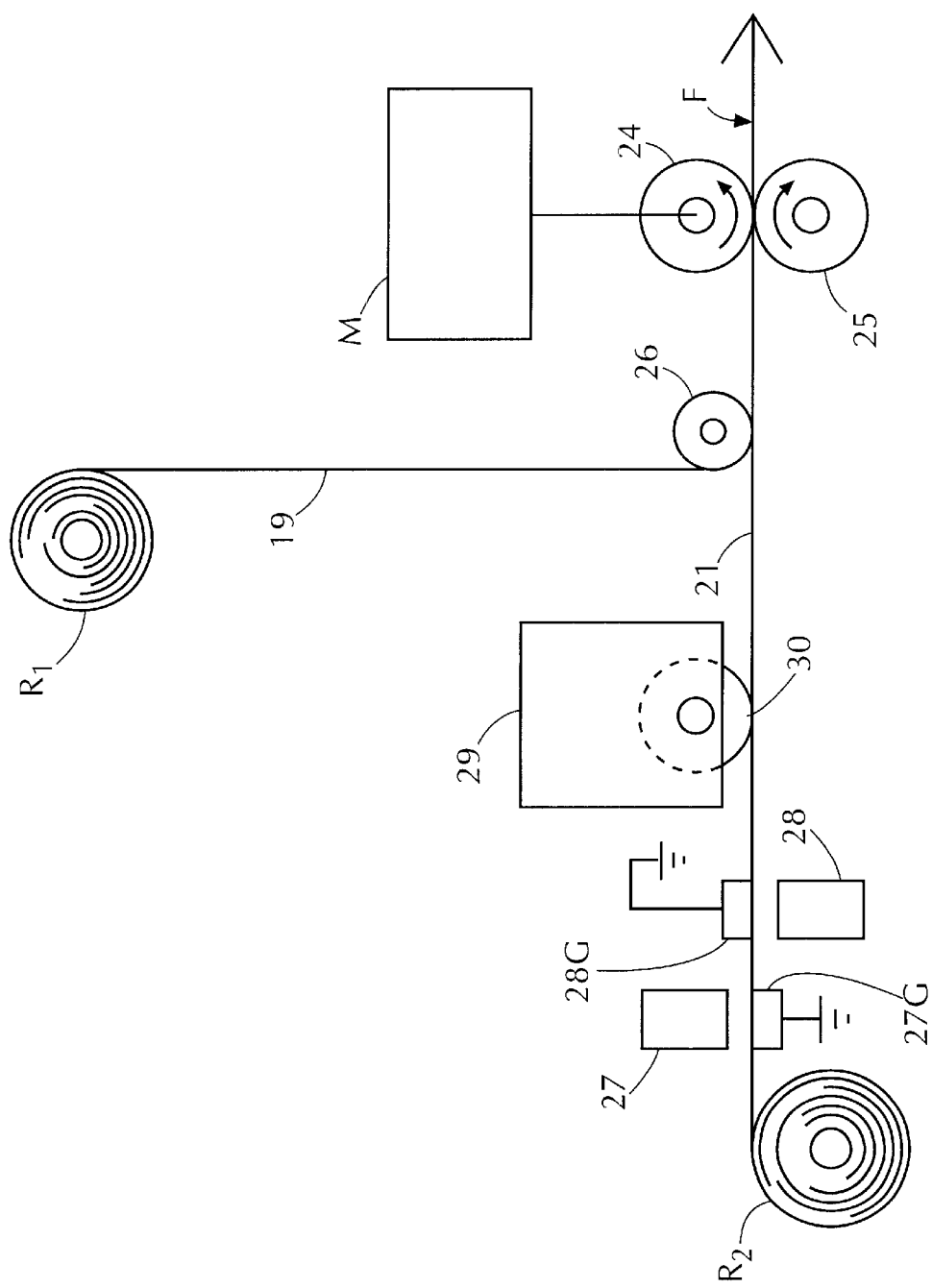
FIG. 5 schematically illustrates a system for producing the laminate sheeting.

FIGS. 1 and 2 illustrate a pouch fabricated from two superposed rectangular panels 10 and 11 formed of a flexible laminate sheeting in accordance with the invention. The side margins 12 and 13 and the lower end margin 14 of the superposed panels are sealed together to create between these panels an expandable envelope or pocket P. This is fillable with a flowable food product F, such as mustard or ketchup.

The upper end section 15 of the pouch is so sealed as to define an interior spout 16 which communicates with pocket P and leads to a normally-sealed outlet 17. A weakened transverse tear line 18 is scored or perforated across the upper end section 15 to intersect outlet 17.

Thus all that is necessary to put the pouch to use is to tear off the end section along tear line 17, thereby opening outlet 17. Then by squeezing the pouch, the mustard or ketchup is extruded therefrom and discharged from the open outlet.

This pouch, though illustrative of a flexible container fabricated of laminate sheeting in accordance with the invention is by no means the only form of pouch that can be so produced. Thus the pouch may be shaped and dimensioned to store potato chips, or candy and other solid food substances. Or the pouch or container formed of the laminate sheeting may be designed to envelop and protectively package small toys and other non-food products which are more or less perishable.

FIG. 3 illustrates the structure of the laminate sheeting F from which panels 10 and 11 of the pouch are derived. Sheeting F is a two ply laminate whose outer ply 19 is a film of synthetic plastic material biaxially or uniaxially oriented to enhance its tensile strength, thereby increasing the tear resistance of the pouch. In practice the film may have a thickness of no more than 2 mils.

Outer ply 19 is cold laminated by a layer 20 of water-based adhesive to an inner ply 21 of a synthetic plastic film material such as polyvinyl chloride whose tensile strength is not as great as that of the outer ply, but whose properties are such that the film is compatible and non-reactive with the food contents of the pouch and lends itself to sealing. Thus when at the margins 12 and 13 of the pouch, the inner ply 21 of the upper panel 10 engages the inner ply 21 of the lower panel 11 of the same film material, these margins may be sealed together by pressure and heat at a temperature sufficient to fuse these plies.

To this end, the upper ply 19 should have a high glass transition temperature (the temperature at which a polymer changes from a vitreous to a softened plastic state), while the inner ply 21 should have a lower glass transition temperature. Thus when the margins of the superposed laminate panels are subjected to heat and pressure by sealing bars, only the pressed together inner plies of the panels will fuse together and the outer plies will be unaffected by the heat. Film materials suitable for outer ply 19 of the laminate are polypropylene, polyethylene, nylon or a polyester such as MYLAR. The tensile strength of a synthetic plastic film is substantially increased by orientation which results in molecular orientation of the film material. In the case of biaxial orientation, orientation is in both the longitudinal and transverse directions. This is usually effected by controlled stretching of the unoriented film.

Lamination of outer ply 19 to inner ply 21 is effected at ambient temperature by water-based adhesive 22 which is preferably a polyacrylic copolymer composition having an affinity for both plies. A water-based adhesive when cured, is not soluble in water and cannot be remoistened. Because the water-based adhesive is fluid at ambient temperature is not a hot melt adhesive, no heat is applied to the biaxially-oriented film as it is being laminated to the inner ply; hence cold lamination is effected.

It is important to bear in mind that an oriented film is heat-sensitive, and that at elevated temperatures, the film relaxes and loses its molecular orientation and tensile strength. Cold lamination at ambient temperature is therefore, essential to the present invention in order to produce a pouch of high tear and burst strength.

It is also to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, this adhesive will not be adsorbed by the film. Essential to the invention-is that the opposing surfaces of the film be treated so as to render them wettable and hence receptive to adhesives, as well as to standard printing inks. To this end, these surfaces are subjected to a corona discharge ionizing treatment which enhances their surface energy, as measured in dynes, and thereby renders them wettable to allow for better bonding of adhesives applied thereto. And the exposed surface of the outer ply 19 may be printed to identify the product in the envelope and its maker.

In order to provide the laminate sheeting with a moisture barrier; so that moisture cannot escape from the food contained in the pouch, the interior surface of the outer ply 19 may be metallized.

A more effective moisture barrier is provided by a laminate sheeting of the type shown in FIG. 4 in which interposed between outer film ply 19 and inner film ply 21 is an intermediate metal foil ply 22. Metal foil 22 is cold laminated by a water-based adhesive 20 to outer ply 19 and by another layer 23 of water-based adhesive to inner ply 21. Hence the metal foil ply is sandwiched between the inner and outer film plies. In practice, instead of a metal foil, the inner surface of film ply 21 may be metallized by vapor deposition.

Because the laminate-sheeting is produced using water-based adhesives to effect lamination of the plies at ambient temperature, the only fumes which are produced as the adhesive dries and cures is water vapor. This vapor is in no way noxious and may be discharged into the atmosphere without the need to treat it to render it innocuous.

When laminating two plastic film together with a water-based adhesive it best before doing so to partially evaporate the water constituent in the coating of the adhesive applied to one film before it is brought in contact with the other film. The reason this is desireable is that the water constituent is not absorbed by the films, as would be the case had the plies been of paper material. Such partial evaporation is effected by infrared lamps or air blowers.

MANUFACTURING SYSTEM

To produce the laminate sheeting shown in FIG. 3, a system suitable for this purpose is illustrated in FIG. 5 in which the oriented film ply 19 is supplied by a reel $R_1$ and the inner synthetic plastic film ply 21 by a reel $R_2$. Both plies are drawn from these reels and fed into a laminator station formed by cooperating rollers 24 and 25 driven at high speed by a motor M. The nip between these rolls is appropriate to the thickness of the webs to be laminated to provide the desired degree of laminating pressure to ensure secure bonding of the webs.

Film web 19 is drawn downwardly from reel $R_1$ which is at an elevated position and is guided by an idler roll 26 into a horizontal path leading into the nip of the combining rolls. Reel $R_2$ is placed at a position to feed film web 21 directly into a horizontal path toward the nip of the combining rolls, and is placed well in advance of the combining station in order to expose a fairly long stretch of film web 21 before it enters the combining rolls.

Along this stretch of film web 21 formed of oriented synthetic plastic film material such as polypropylene having a high dielectric constant, is a first corona discharge electrode 27 which is spaced above the upper surface of the film to create an ionizable air gap therebetween. Film web 21 runs along a ground electrode 27G in vertical alignment with discharge electrode 27. The resultant corona discharge, which is directed toward the upper surface of the film web, increases the surface energy at the web surface to render it wettable and, therefore, receptive to adhesives and printing inks. But it does not affect the molecular orientation of the film and hence does not impair the strength of the film and its resistance to tear.

Also along the stretch of film following the first corona discharge station 27–27G is a second corona discharge station for subjecting the undersurface of film web 21 to a corona discharge to render this surface wettable. The second station consists of a corona discharge electrod 28 which is spaced from the undersurface of film web 21 to create an air gap therebetween, and a cooperating ground electrode 27 G engaging the upper surface of the web.

Intermediate the second corona discharge station 23–23G and the combining station is an adhesive applicator 29 having a coating roll 30 which engages the now wettable upper surface of film web 21 and applies thereto the water-based, acrylic polymer adhesive for cold-laminating film web 19 to the film web 21 to form the laminating adhesive layer 20 of the laminate web F.

Thus concurrently entering the nip of pressure rolls of the combining station at ambient temperature are film web 19 and the adhesive-coated film web 21. These webs are subjected to pressure by pressure rolls 24 and 25, cold-lamination being effected by this action. The laminated webs emerging from the combining station form the laminate web F. Because the exposed surface of film ply 19 of the laminate F has been rendered wettable by corona discharge treatment, it is receptive to printing inks and may be decoratively or otherwise printed.

While there has been shown a preferred embodiment of the invention, it will be appreciated that many changes may be made therein without departing from the spirit of the invention.

Thus when the laminate sheeting is constituted by an outer film ply laminated to an inner film ply, one may laminate to the outer film ply by means of a water based adhesive a paper ply. This paper ply may be printed or metalized to provide a three-ply decorative sheeting from which pouches may be formed.

We claim:

1. A pouch or container for forming an envelope to protectively package a product such as a flowable or solid food substance, said envelope being formed of two superposed panels marginally sealed to better define a pocket to accommodate said product, each panel being fabricated from a laminate sheeting comprising:

A. an outer ply of oriented synthetic plastic film having a glass transition temperature and a first surface which is corona-discharge treated to render it wettable and receptive to a water-based adhesive; and B. an inner ply of synthetic plastic film having a lower glass transition temperature than the glass transition temperature of the outer ply, the inner ply further having a first surface that faces the first surface of the outer ply, with the first surface of the inner ply being corona-discharge treated to render it wettable and receptive to a water-based adhesive, and further being adhesively cold-laminated by a water-based adhesive to the first surface of the outer ply at ambient temperature to produce a laminate having high tensile strength and tear resistance, whereby when the two panels are superposed, the inner plies are then in contact with each other, and when the superposed panels are marginally sealed together by heat and pressure applied thereto, the inner plies are then caused to fuse but the outer plies are unaffected by the heat and the orientation of the outer plies is unaffected.

2. A pouch as set forth in claim 1, in which the adhesive is an acrylic copolymer.

3. A pouch as set forth in claim 1, in which the outer ply film is metallized to provide a moisture barrier.

4. A pouch as set forth, in claim 1 in which a metal foil intermediate ply is sandwiched between the outer ply and the inner ply and is cold laminated thereto.

5. A pouch as set forth in claim 1, in which the outer film ply is formed of a polyester film.

6. A pouch as set forth in claim 1, in which the inner ply is formed of polyethylene film.

7. A pouch as set forth in claim 1, in which the panels are sealed together define a spout to communicating with the pocket and leading to an outlet.

8. A pouch as set forth in claim 1, in which the surface of the inner ply which is adhesively laminated to the outer ply is corona-discharge treated to render it wettable to adhesives.

9. A pouch as set forth in claim 1 in which the adhesive is a polyacrylate copolymer.

* * * * *

UNITED STATES PATENT AND TRADEMARK OFFICE
CERTIFICATE OF CORRECTION

PATENT NO. : 6,348,246 B1
DATED : February 19, 2002
INVENTOR(S) : Finestone et al.

It is certified that error appears in the above-identified patent and that said Letters Patent is hereby corrected as shown below:

<u>Column 6,</u>
Line 48, change "sealed together define a spout to communicating with the" to
-- sealed together to define a spout communicating with the --.

Signed and Sealed this

Twenty-third Day of April, 2002

Attest:

JAMES E. ROGAN
*Attesting Officer*        *Director of the United States Patent and Trademark Office*